(12) United States Patent
Lapie

(10) Patent No.: US 6,253,163 B1
(45) Date of Patent: Jun. 26, 2001

(54) PORTABLE OBJECT READER TERMINAL AND PROCESS FOR SELF-DIAGNOSIS AND SUPERVISION OF SAME

(75) Inventor: Ronan Lapie, Volx (FR)

(73) Assignee: Bull CP8, Louveciennes (FR)

( * ) Notice: Subject to any disclaimer, the term of this patent is extended or adjusted under 35 U.S.C. 154(b) by 0 days.

(21) Appl. No.: 09/125,714

(22) PCT Filed: Dec. 23, 1997

(86) PCT No.: PCT/FR97/02388

§ 371 Date: Aug. 24, 1998

§ 102(e) Date: Aug. 24, 1998

(87) PCT Pub. No.: WO98/28720

PCT Pub. Date: Jul. 2, 1998

(30) Foreign Application Priority Data

Dec. 24, 1996 (FR) ................................. 96 15997

(51) Int. Cl.[7] ................................. G21C 17/00
(52) U.S. Cl. ............... 702/183; 702/188; 235/380; 714/25; 714/30
(58) Field of Search .................... 702/183, 188, 702/182; 235/380, 432, 383, 462, 487, 492; 714/26, 30, 39, 718, 25

(56) References Cited

U.S. PATENT DOCUMENTS 4,777,355 10/1988 Takahira .
5,047,615 * 9/1991 Fukumoto et al. ............... 235/432
5,386,106 * 1/1995 Kumar ............................... 235/462
5,557,088 * 9/1996 Shimizu et al. .................. 235/383
5,979,757 * 11/1999 Tracy et al. ....................... 235/383
6,084,528 * 7/2000 Beach et al. .................. 340/825.35

FOREIGN PATENT DOCUMENTS 0131331 1/1985 (EP) .
0387972 9/1990 (EP) .

* cited by examiner

*Primary Examiner*—Marc S. Hoff
*Assistant Examiner*—Hien Vo
(74) *Attorney, Agent, or Firm*—Miles & Stockbridge P.C.; Edward J. Kondracki

(57) ABSTRACT

A terminal includes a memory in which is stored an application program and further includes at least one output constituted either by a display, or by a printer, or by a communications network, or by a portable object. The terminal cooperates with a portable object such as a "smart card", which includes a non-volatile memory area (ZD) containing data. The terminal includes a reader which communicates with the portable object and is characterized in that there is provided a mechanism for reading or storing self-diagnostic or supervisory data (Ti, Dj, Sk) in the terminal memory and a mechanism for sending the data to outputs (1–4) of the terminal specified as a function of information supplied by the self-diagnostic or supervisory data following the execution of at least one task Tt of the application program operating in connection with the portable object.

14 Claims, 4 Drawing Sheets

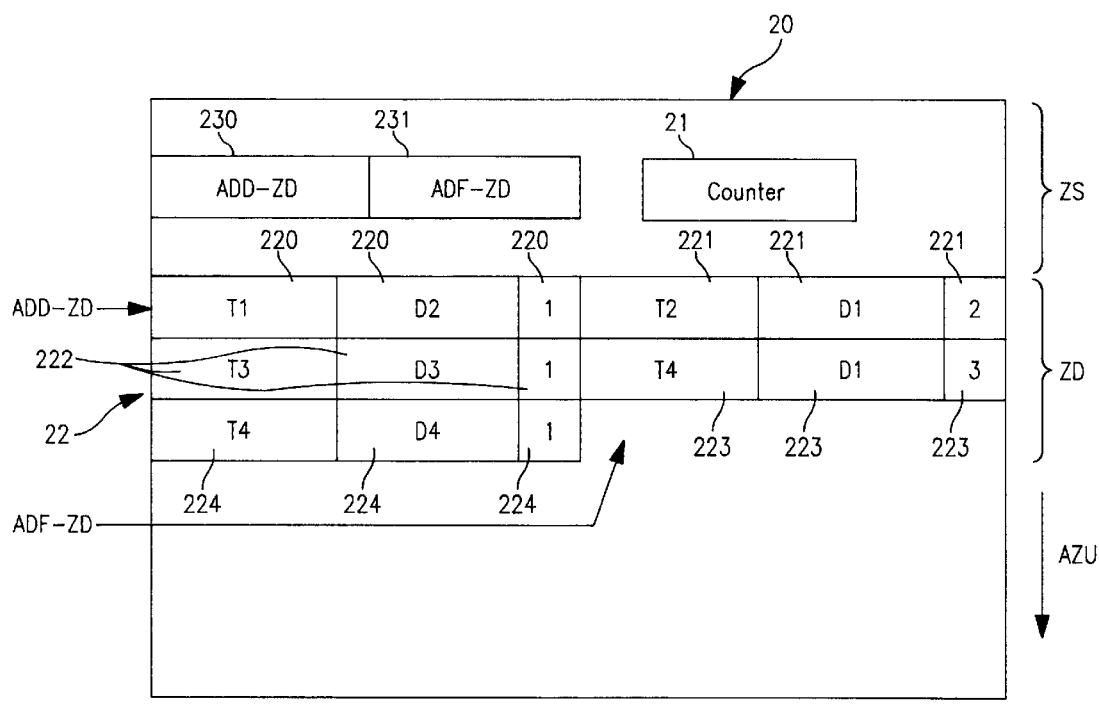

PORTABLE OBJECT READER TERMINAL AND PROCESS FOR SELF-DIAGNOSIS AND SUPERVISION OF SAME

BACKGROUND OF THE INVENTION

1. Field of the Invention

The present invention relates to a terminal and a process for self-diagnosis or supervision and the portable object of the microcircuit card or so called "smart card" type used in a process or terminal or reader of this type. Such portable objects comprise a central processor, a program memory containing an executable code constituting the operating system, a non-volatile and programmable data memory, and one or more communication interfaces. The terminal is a device equipped with an interface compatible with the portable object; and include a central processor and software that is capable of communicating and operating on the data issuing from the non-volatile data of the portable object.

2. Description of Related Art

In general, terminals adapted to cooperate with microcircuit cares, i.e. smart cards are equipped with specific software corresponding to their utilization, for example portable payment terminals are equipped with an operating program of the banking type. This software is produced or specified by the institution that manages this application; in the example cited, this is a banking institution. The institution that manages the application is generally not the manufacturer of the terminal; but purchases or orders the manufacture of the hardware part, that is the terminal, and it installs the specific program into it in order to configure its terminal for its own application. The banking institution thereby has the advantage of purchasing a standard, and therefore inexpensive, product and adapting it according to its needs. The manufacturer offers a basic model which can be suited to a plurality of applications, which enables it to expand its market.

An institution running a given application may wish to use a plurality of card reader terminal models. Because it is not desirable to develop application software for each of the terminals manufacturers generally implement a basic software layer that ensures the interface between the hardware and the application software. This software layer enables the same application software to be adapted to different terminals. One way to do this is to create an interpreter so that the institution can develop its application in a well-known high-level language, nearly independent of the constraints of the hardware. Another way to do this is to set up a low-level software layer that manages all the hardware input-outputs and to make available to the operating institution a library of primitives that the application software will call.

In all cases, it must be possible to validate or to test the terminal in its entirety. The validation or testing of the terminal must take into account both parts: the hardware with its basic software and the application software. A self-test makes it possible to verify each device of the terminal. The self test is generally constituted by a routine implemented in the basic software. The testing of the application software must be done in the laboratory. Accordingly, it is important in this type of application to properly verify the operation of the program before it is placed in service. However, due to the multiplicity of cards available for use a very large number of specific cases are not reproducible in the laboratory.

SUMMARY OF THE INVENTION

The object of the subject invention is to validate or test, under normal usage conditions, the operation of application software.

To this end, the invention relates to a terminal equipped with an application program, with at least one output constituted either by a display, or by a printer, or by a communication network, or by a portable object, and cooperating with a portable object equipped with a non-volatile memory area containing data, and comprising a reader which communicates with this portable object, characterized in that the device comprises means for reading or storing in its memory diagnostic or supervisory data and means for sending these data to outputs specified as a function of information supplied by the self-diagnostic or supervisory data following the execution of at least one task of its application program in connection with the portable object.

According to another of the subject invention, the means for sending the self-diagnostic data are activated a certain number of times.

According to another of the subject invention, the means for sending the self-diagnostic or supervisory data comprise means for writing in the portable object connected to the device.

According to another of the subject invention, the self-diagnostic or supervisory data are constituted by at least one triplet of information corresponding, for a first piece of information, to a predetermined task of the application program, for the second piece of information to a data type correlated to the task executed and to be presented to an output, and for the third piece of information to a value for specifying the output to which the data type must be presented among those present in the terminal.

According to another of the subject invention, the device has a means for testing for the presence of self-diagnostic or supervisory data in a portable object and for initiating the reading and the storage of these data in a specific area ZTD of the memory of the terminal.

According to another of the subject invention, the terminal comprises means for entering self-diagnostic or supervisory data into a portable object.

Another object of the present invention is to provide a process for supervising the operation of a terminal or for the self-diagnosis of a terminal.

This object is achieved due to the fact that the self diagnostic or supervisory process, from at least one triplet of information corresponding, for a first piece of stored information, to a predetermined task of an application program executed either by a portable object or by a terminal, for the second piece of information to a data type correlated to the task executed and to be presented to an output, and for the third piece of information to a value for specifying the output among those present in the terminal, is characterized in that it is comprised of:

- executing a task of the application program in the terminal;
- testing an indicator either in the terminal or in the portable object to determine whether a self-diagnostic or supervisory function is operational, then in the case of a positive response;
- searching in the memory of either the portable object or the terminal to see if among the triplets of information stored there is a triplet wherein the first piece of information corresponds to the predetermined task executed by the terminal or the card;
- sending to-the output specified by the triplet thus read the value of the datum correlated to the task executed and to be labelled by the second piece of information in the triplet.

According to another of the subject invention, the process comprises a testing step comprised of determining whether there are other tasks to be executed, and following the execution of these tasks, searching for all of the triplets of information corresponding to the execution of this task.

According to another of the subject invention, the process comprises a step for reading from a portable object storing in its nonvolatile memory a plurality of triplets and a step for storing these triplets in a non-volatile memory area of the terminal, followed by a step for activating an indicator of an active self-diagnostic or supervisory function.

According to another of the subject invention, the process comprises a testing step for determining whether the portable object is a card specific to the self-diagnostic or supervisory function or a so-called general-purpose card.

According to another characteristic the self-diagnostic or supervisory data are constituted by a fourth field of information containing in the portable object initially the write address (Adr-V), the number of octets to be written (Nb-V), and after the self-diagnosis operation, the value to be written (Val).

Another object of the present invention is to provide a portable object that can be used with a terminal and the self-diagnostic or supervisory process as described herein.

This object is achieved due to the fact that the portable object is a microprocessor card operating by means of an operating system stored in the card and comprising a non-volatile memory containing at least one triplet of information in a predetermined area of this non-volatile memory whose location is defined by address fields located in the memory part used to store the operating system.

According to another of the subject invention, the part of nonvolatile memory used to store the operating system also comprises, in a memory field, a piece of information constituting a counter of utilizations of the self-diagnostic function.

According to another of the subject invention, the memory area storing the operating system comprises a field which makes it possible to store an indicator of the activation of the self-diagnostic or supervisory function.

BRIEF DESCRIPTION OF THE DRAWINGS

Other characteristic and advantages of the present invention will become more clearly apparent with the reading of the following description given in reference to the appended drawings, in which:

FIG. 1 is an explanatory table of the triplets constituted by elementary tasks, data types and output types that can be associated with the execution of each of the tasks of an application program;

FIG. 2 is a diagram of the non-volatile memory areas used in a portable testing object necessary to the implementation of the process of the invention;

DESCRIPTION OF THE PREFERRED EMBODIMENTS

Figure 3:
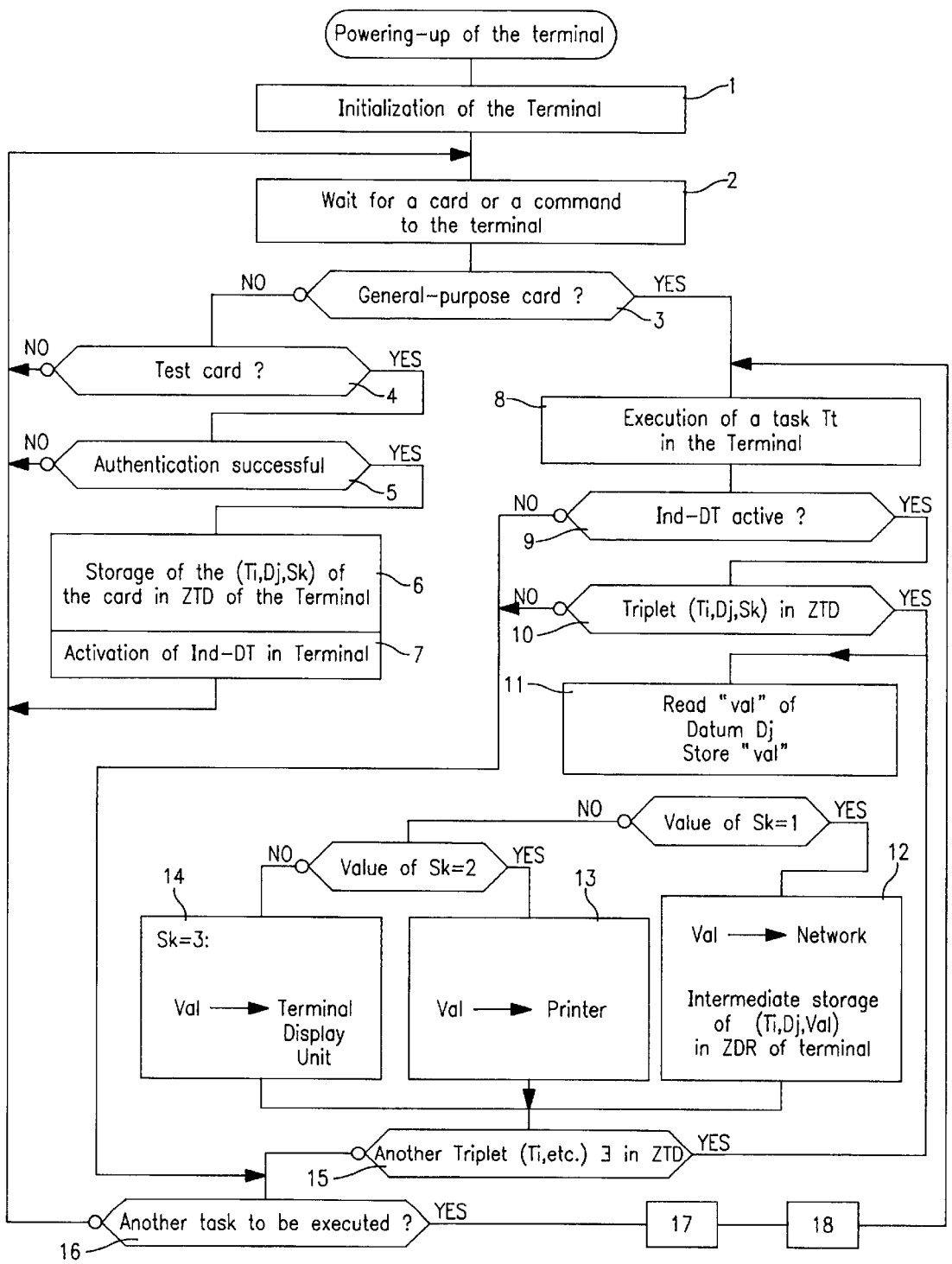
FIG. 3 shows the various steps in the execution of the programs for initializing the terminal and executing the self-diagnostic function.

One way to implement the invention is comprised, in a first variant, of using a microprocessor card operating by means of an operating system stored in the card and constituting a so-called "smart card" that is pre-initialized with the self-diagnostic data, and of having this data taken into account by the terminal when testing the application software. An application software in a terminal can be broken down into elementary tasks which occur at predetermined moments. For example, for a banking application, a transaction can be broken down into the following elementary tasks (Ti): Verification (T1, FIG. 1) of whether the card inserted is authorized, Authentication (T2) of the bearer, Acquisition (T3) of the data of the transaction in the terminal, Writing of this data into the microcircuit of the card, and Validation (T4) of the transaction in the terminal and the card.

In addition, and always during a transaction, the application software manipulates data. This data can be used temporarily, like the Code created by the bearer (Cp), which is stored in the memory of the terminal, or the identity of the bearer (Ip), which is stored in the card, or like the Amount of the transaction (Mt) or the Date of the transaction (Dt), which are stored in the terminal and the card. During the execution of each elementary task, each of these data may be initialized, modified or unchanged. The self-diagnostic utility function of the application software is comprised of verifying the data of the transaction at the time of certain tasks, under normal usage conditions. This function can be performed either by the basic software or by the application software.

To do this, the operator responsible for the test develops a grid composed, on one side, of the identifiable elementary tasks, designated Ti, and on the other side of data Dj constituted by information such as: Cp, Ip, Mt and Dt. FIG. 1 shows an example of such a grid. In order to test the correct execution of a transaction, the operator chooses to verify the value of certain data during the execution of specific tasks. This involves associating a datum Dj with a task Ti; these associations are symbolized by crosses in the grid of FIG. 1. A third piece of information Sk is added. The value of this code indicates the type of output used to which the datum to be verified is to be sent. For example, the data is sent to the network when Sk is at a first value, for example 11111 (Sk=1), to the printer when Sk is at a second value, for example 11211 (Sk=2), or to the screen when Sk is at a third value, for example 11311 (Sk=3). The operator enters the triplets of information (Ti, Dj, Sk) into a special so-called diagnostic central processor, which central processor is equipped with a card reader. The diagnostic software is configured in accordance with the application to be tested so that the triplets (Ti, Dj, Sk), when captured, are identified on the screen by the precise indication of the elementary tasks and the data to be verified, and not the numeric labels Ti, Dj, Sk.

The card containing the self-diagnostic data is either a special card or a general-purpose card normally used for an application. A detailed description of an embodiment is given for each case.

The first case described is that in which a special card called a "test card" (20, FIG. 2) is used to contain the self-diagnostic data. A security procedure is implemented to prevent a defrauder from being able to use a card of this type in an unauthorized manner. The test card contains in a secret memory area, not shown, a secret so-called diagnostic code "KD." This secret code must first be presented to the card, which verifies it and, if it is equal to a reference code, authorizes the writing of the self-diagnostic data into the programmable memory of the card.

While providing for the storage of the self-diagnostic data, the non-volatile programmable memory of the test card also has, in addition to the system area ZS which contains the operating system of the card and the other usable area (AZU) which allows other types of storage, an area (22) called "ZD." It is in this area that the triplets (Ti, Dj, Sk) are stored in-succession. Thus, a first area (220) of a memory allows the storage of the first triplet T1, D2, 1; a second area (221) allows the storage of the second triplet T2, D1, 2; a third area (222) allows the storage of the third triplet T3, D1, 1; a fourth area (223) allows the storage of the fourth triplet D4, D3, 3; a fifth area (224) allows the storage of the triplet T4, D4, 1; T1, T2, T3, T4, D1, D2, D3, D4 respectively representing the information in FIG. 1. It is obvious that the portable object can comprise more or fewer triplets depending on the type of supervision or self-diagnosis that it is desirable to perform on the tasks executed by the application program. The area ZD is labelled by its start address "ADD-ZD" and its end address "ADF-ZD"; the two address values are stored in the part (230, 231) of the programmable memory allocated to the operating system.

The non-volatile programmable memory is of the EPROM, EEPROM, FeRAM, SRAM or FLASH type. FIG. 2 describes the organization of this memory using the information cited in FIG. 1. Advantageously, the datum Dj is the physical address of the datum to be verified in the working memory of the terminal.

Once programmed, the test card is inserted into the terminal in which the self-diagnostic function must be run. FIG. 3 is a flow chart illustrating the chronology of the events of the program, constituted by a wait and test sequence (1, 2, 3), the test triggering, as a function of the result, either a sequence for loading the terminal with the self-diagnostic data (4 through 7, FIG. 3), or a sequence for executing the self-diagnostic program (8 through 16, FIG. 3), which is incorporated either into the basic software of the terminal or into the-application software. Step 1 is the initialization of the terminal after it is powered up, and step 2 is the phase for waiting for an order or an insertion of a card. In step 3, the terminal tests whether the card inserted into the reader is a general-purpose card, and in step 4 whether the card is a test card. In the latter case, the terminal executes in step 5 a procedure for authenticating the card by means of a reference code or by means of a standard challenge-response authentication schema using an algorithm and a secret key (KD).

Once the test card has been identified and authenticated, the program of the terminal reads in step 6 the information contained in the area ZD. The selection and the location of the triplets are performed with the aid of the two pointers ADD-ZD and ADF-ZD. The triplets (Ti, Dj, Sk) read successively in the area ZD are stored in the same order in an area of the memory of the terminal called ZTD. Once the last triplet has been stored in the area ZTD, the terminal program, in step 7, sets a self-diagnostic indicator "Ind-DT" in the memory of the terminal to the active state. Then the terminal program loops back to wait for a command or another insertion of a card in step 2.

A new card is inserted and if it is a general-purpose card compatible with the application run by the terminal. As stated above, the application software in the terminal is broken down into elementary tasks Ti which can be executed individually (step 8). At the end of the execution of each task, which can be labelled by the code Ti, the application program, in step 9, tests the indicator Ind-DT of the terminal. If it is inactive, the self-diagnostic function is not operational, and the program continues to execute the other tasks. If the indicator Ind-DT is active, the program of the terminal, in step 10, searches the area ZTD of the memory of the terminal for the first triplet (Ti, Dj, Sk) for which Tt=Ti, that is, to see if there is a datum to be tested as a result of the task that has just been executed. if yes, in step 11, the value "Val" of this datum (Dj) is temporarily stored in the memory of the terminal, and as a function of the value of Sk, it is processed in the following way:

If Sk is equal to "1" (step 12), the datum Dj must be sent to the network. In this case, a block of three data is constituted by the value of the field Tt, the label Dj of the datum to be analyzed and the value "Val" of this datum extracted from the memory of the terminal. These blocks are stored one after another in an area of the memory of the terminal called "ZDR." The content of this area is sent to the network at the end of the transaction or when there is a request by the network for self-diagnostic data. Once all the data have been transmitted, the area ZDR is cleared so that it can be reused when a there is new insertion of a card.

If Sk is equal to "2" (step 13), the datum Dj must be sent to the printer of the terminal for printing. In this case, a message is created in the software buffer of the printer; it is composed of a text (ASCII code) indicating the nature of the datum, for example "AMOUNT," followed by the decimal or hexadecimal value of the datum Dj; the message ends with a separator and a "CARRIAGE RETURN—SKIP LINE." It is possible to gather all of the self-diagnostic messages and print them at the end of the transaction.

If Sk is equal to "3" (step 14), the datum must be sent to the display unit of the terminal for display in this case, a message is created in the buffer of the display unit, composed of a text (ASCII code) indicating the nature of the datum, for example "AMOUNT," followed by the decimal or hexadecimal value of the datum Dj. The messages corresponding to each element (Tt, Dj, "3") are successively displayed for a certain time set by the program. It is possible to gather all of the messages and display them at the end of the transaction; the scrolling of the messages can be controlled by pressing a key on the keyboard of the terminal.

Once the datum Dj has been processed, the program verifies in step 15, whether there are other triplets in ZTD for which Ti=Tt. If yes, the program loops back to step 11 and processes a new triplet. For each elementary task, the search for triplets is performed by scanning the entire area ZTD. If there are no more triplets (Ti=Tt, Dj, Sk) to be processed, the program, in step 16, continues in sequence and may, in a variant, proceed to another task without executing the steps 17 and 18 described below. If there are no other tasks to be executed, the program loops back to step 3, to wait for a command or for a new insertion of a card.

It is possible to associate a counter initialized with a certain number with the indicator Ind-DT in the terminal so that the self-diagnostic function is only activated for this number of general-purpose card insertions. In order to do this, the operator has pre-entered this number into a specific location (21, FIG. 2) of the programmable memory of the test card, for example, next to the locations (230, 231) of ADD-ZD and ADF-ZD. In this case, this number is stored in the memory of the terminal after the insertion of the test card in step 6. Then this number is decremented (step 17) at the end of each execution of a self-diagnostic function (a YES output from step 16). When it reaches 110,11 the indicator Ind-DT is set to the inactive position (step 18) and the content of the area ZTD is possibly erased.

If the counter is not installed, steps 17 and 18 do not exist and the self-diagnostic function is executed only once or indefinitely until a new insertion of the test card switches the indicator Ind-DT to the inactive position.

Figure 4:
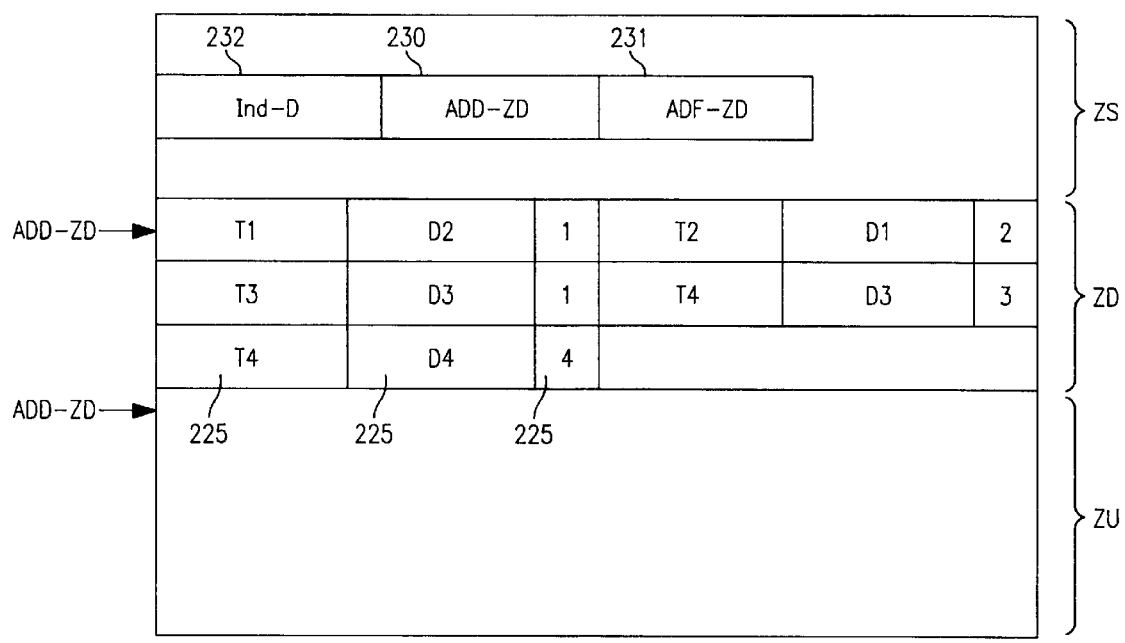
FIG. 4 shows schematic view of the areas for storing information in the non-volatile memory of a so-called general purpose portable object.

It is possible to avoid the utilization of a test card and to use only general-purpose cards, on condition that they support the special self-diagnostic functions. For this reason, the programmable memory of the general-purpose card contains, in addition to the system area ZS and the user area ZU, an area ZD which is labelled by its start address "ADD-ZD" and its end address "ADF-ZD" (see FIG. 4). The programmable memory of the general-purpose card also contains in its system area, in a location (232), an indicator "Ind-D" which indicates whether or not the self-diagnostic function is active. All of these data ADD-ZD, ADF-ZD, Ind-D are stored in locations (230, 231, 232) of the part ZS of the programmable memory allocated to the operating system. The two address values are determined and written into the area ZD during the customization of the card; this method is simple to implement but has the drawback of requiring the reservation of a sizeable location in all cards that can be used for the self-diagnosis.

Advantageously, the location in the area ZD can be allocated dynamically by the operating system of the card after the correct entry of the code KD. The operator indicates to the card the number of triplets (Ti, Dj, Sk) or the number of octets to be reserved for ZD. The operating system of the card then searches in the programmable memory for a blank location of sufficient size. If the memory does not contain any such blank location, the operating system returns an error message and interrupts the procedure for entering the self-diagnostic data. In the opposite case where there is sufficient space, the operating system stores the start address "ADD-ZD" and the end address "ADF-ZD." It will be seen below how, after the execution of the self-diagnostic function, it is possible to erase the presence of the area ZD, thus releasing this memory space.

The same is true for the test card. A security procedure is provided in order to prevent a defrauder from being able to use a general-purpose card to enter self-diagnostic data. A mechanism of the challenge-response type with an algorithm and a secret code makes it possible to authenticate the operator and authorize the writing and reading (it will be seen why below) of the triplets in ZD.

In the case where a general-purpose card is used to transmit the self-diagnostic data, the code Sk can assume a fourth value 4; this value indicates that the value of the datum Dj to be verified has been written into the card. In this case, a fourth field located at an address "Adr-VII" is allocated at the end of the triplet (Ti, Dj, Sk=4), and thus quadruplets are stored. The size of this field corresponds to that of the data to be written; the operator must therefore specify the number of octets "Nb-V" in this fourth field, and its content is initially constituted by the write address (Adr-V), then after the output by the value "Val," as seen below. The fifth triplet (225) of FIG. 4 has this structure. When all of the triplets (Ti, Dj, Sk) (220 through 225) have been entered into the area ZD, the indicator "Ind D" is set to the active position, thus indicating that the self- diagnostic function is active in this card.

Figure 5:
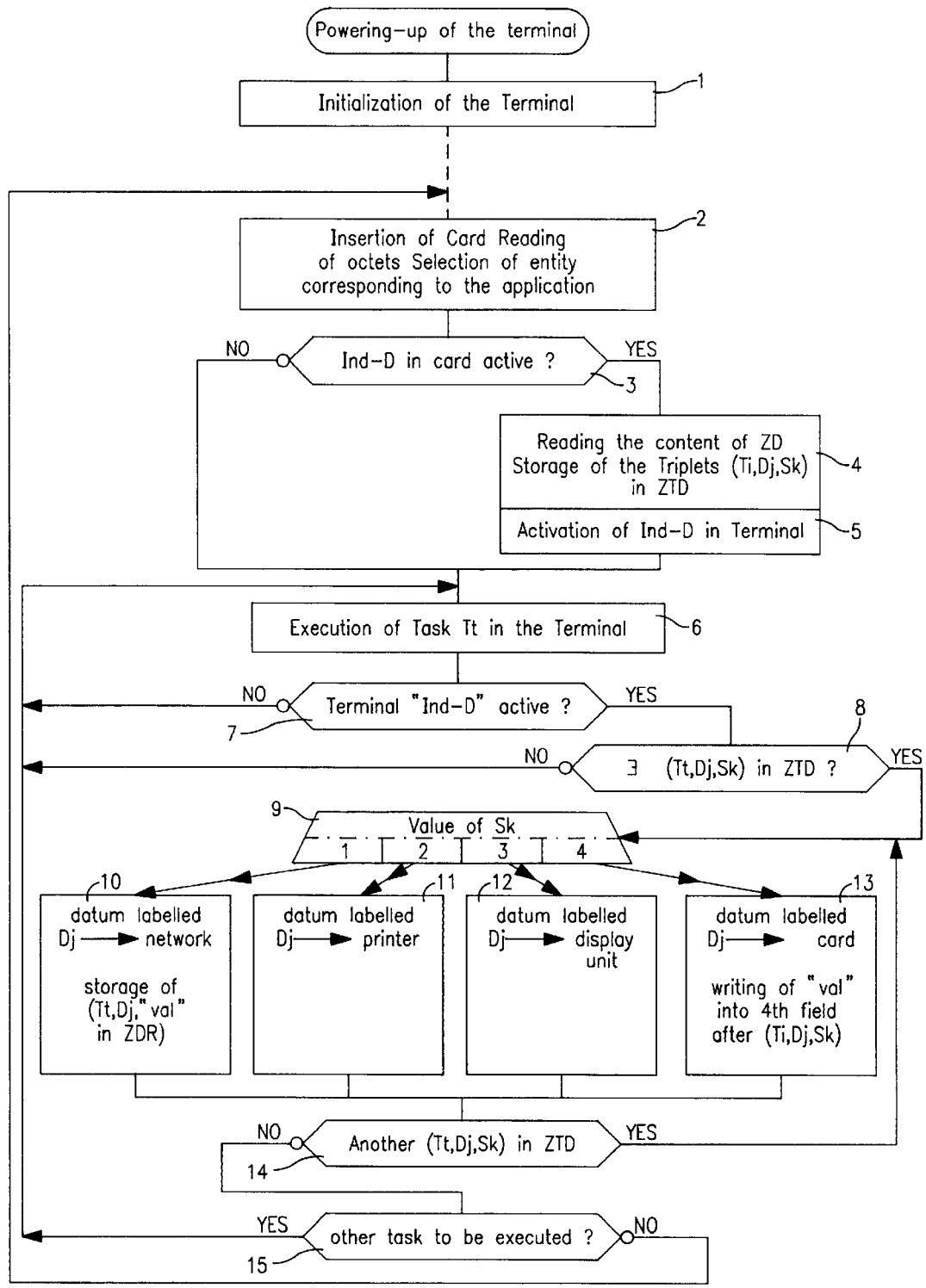
FIG. 5 shows the various steps in the execution of a program for initializing the terminal and executing the self-diagnostic function in this terminal with a so-called general-purpose card.

FIG. 5 shows the sequence of operations when the card described above is inserted into a terminal. Step 1 is the initialization of the terminal after it is powered up and step 2 is the phase for waiting for the insertion of a card; the program continues when the card is recognized as being compatible with the application through the terminal's recognition of the presence of the necessary information. In this step 2, the program performs the selection of the entity corresponding to the application. Unlike the test card, when the general-purpose card is inserted by the bearer, the latter can be completely unaware that the self-diagnostic function is active.

In step 3, the terminal tests whether the indicator Ind-D in the card is set to the active position and thus whether the self-diagnostic function is operational. The indicator can be sent either by a particular value in the octets transmitted by the card during the power-up phase, or by a particular value transmitted during the selection of the entity corresponding to the application used in the card. If Ind-D is active, the program proceeds to step 4. During this step 4, the area ZD is read with the aid of the two address values ADD-ZD and ADF-ZD and all of the triplets read in the card are stored in the memory ZTD of the terminal. If the triplet comprises a datum Sk whose value is "4," the operating system of the card returns, in addition to the three values Ti, Dj and Sk, the address "Adr-v" of the fourth field reserved for writing the datum into ZD and the number of octets "Nb-v" in this field. For security reasons, read access to the area ZD of the card is only granted by the operating system of the card if the indicator Ind-D of the card is active. Once all of the information contained in the area ZD has been stored in the memory area ZTD of the terminal, the terminal sets its self-diagnostic indicator Ind-D to the active position (step 5). Steps 3, 4 and 5 are parts of the sequence for initializing the dialogue between the general-purpose card and the terminal and are executed before the execution of the application program.

As stated above, the application software is broken down into elementary tasks which can be tested individually. At the end of the execution of each task, which can be labelled by a number Tt (step 6) for example the basic software resumes control and tests whether the diagnostic indicator inside the terminal is active (step 7). If it is active, in step 8 the program searches to see if there is an element (Ti, Dj, Sk) stored in the area ZTD that has a field value Ti equal to that of Tt. If yes, there is a datum (labelled Dj) to be verified as a result of the task that has just been executed; the value of this datum is then temporarily stored in the memory of the terminal. As a function of the value of Sk, it is processed in the following way (step 9):

If Sk is equal to "1" (step 10), the datum Dj must be sent by the terminal to the network. A block of three data is then constituted by the value of the field Tt, the label Dj of the datum to be analyzed and the value "Val" of this datum extracted from the memory of the terminal. These blocks are stored one after another in an area of the memory of the terminal called "ZDR." The content of this area is sent to the network at the end of the transaction or when there is a request from the network for the self-diagnostic data. Once all of the data has been transmitted, the area ZDR is cleared so that it can be reused when a there is a new insertion of a card.

If Sk is equal to "2," the datum must be sent to the printer of the terminal, and the program continues with step 11. During this step 11 a message is created in the buffer of the printer, composed of a text (ASCII code) indicating the nature of the datum, for example "AMOUNT," followed by the decimal or hexadecimal value of the datum Dj, and the message ends with a separator and a "CARRIAGE RETURN—SKIP LINE." Advantageously, it is possible to gather all of the messages and print them at the end of the transaction.

If Sk is equal to "3," the datum must be sent to the display unit of the terminal, and the program continues with step 12. During this step 12, a message is created in the buffer of the display unit, composed of a text (ASCII code) indicating the nature of the datum, for example "AMOUNT," followed by the decimal or hexadecimal value of the datum Dj. The messages corresponding to each element (Tt, Dj, "3") are successively displayed for a certain time set by the self-diagnostic software. Advantageously, it is possible to gather all of the messages and display them at the end of the transaction; the scrolling of the messages can be controlled by pressing a key on the keyboard of the terminal.

If Sk is equal to "4," the datum must be stored in the card, and the program continues with step 13. During this step 13, a fourth field is reserved for this purpose in ZD, the address "Adr-v" of this fourth field and the number of octets "Nb-v" in this field having been stored in the area ZTD during the loading of the self-diagnostic data into the terminal. The terminal then sends the card a write command with the following parameters:

Write address: Adr-v

Number of octets to be written: Nb-v

Value to be written: "Val" of the datum Dj.

The write operation in the area ZD is only authorized by the operating system of the card when the fourth field of a triplet of the Sk=4 type corresponds to the Ti. In the case where the triplet Ti of the card is not of the Sk=4 type, the write operation is denied. An execution report is systematically returned to the terminal after each write command; if the latter has not been successful, the terminal warns the user with a message. The utilization of the stored data is explained below. A variant is comprised of temporarily storing all the values of the data Dj of the Sk=4 type and of executing the commands for writing the values at the end of the transaction.

Once the datum Dj has been processed, in step 14, the program verifies whether there are other triplets in the area ZTD for which Tt=Ti. If yes, the program loops back to step 9 and processes a new triplet. For each elementary task, the search for triplets is performed by scanning the entire area ZTD. If there are no more triplets (Ti=Tt, Dj, Sk) to be processed, the program proceeds to step 15, searching for another task to be executed. If there are no other tasks to be executed, the program loops back to step 2 to wait for a new insertion of a card.

In the case where a general-purpose card is used to transmit the self-diagnostic data, the self-diagnostic function should be able to be executed only once. In effect, the operator may intend to perform only one test of the card reader terminal, after which the data must not leave the terminal. Moreover, if the datum to be verified has a field Sk of the 4 type only, a single storage is possible. In order to start the function another time, the card must be reprogrammed by the operator. To prevent it from being used several times with the self-diagnostic function, just after the reading of the area ZD by the terminal, the operating system of the card will set the indicator Ind-D to the inactive state. For security reasons, it can also erase all the triplets of the Sk=1, 2 and 3 types. The indicator Ind-D is inactive, and the reading of the area ZD is no longer possible.

The data corresponding to the type SK=4 are processed when the general-purpose card enters a terminal authorized to read it, that is, a terminal that is authenticated in the same way as when the self-diagnostic data are written. Once all the triplets have been read, the total erasure of the area ZD an be carried out. This erasure can be triggered by a special command or during the first write operation in the area ZD. The erasure, which is justified for security reasons, makes it possible to release the space occupied by the area ZD. This location can be used by the application.

This "one-shot" style of operation of the self-diagnostic function can be advantageous when a person reports his credit card to a bank branch declaring that his card "does not work" in a certain type of payment terminal. The branch will store the self-diagnostic data in this card, specifying that the data of the transaction (amount, date, certificate value) are to be written into the card by setting the third field Sk, in each triplet corresponding to a task to be recorded, at the value "4" (Sk=4). The person returns to the merchant where the terminal to be tested is located, executes a transaction and returns to his branch, which analyzes the information stored in ZD, or has it analyzed remotely.

One-shot operation is also advantageous for verifying the operation of a terminal suspected of fraud. A banking institution discovers that transactions in a terminal have been credited without there having been any request to debit client accounts. The banking institution sends inspectors provided with general-purpose cards with the self-diagnostic function. Upon their return, the data loaded into the card are analyzed.

Another example: a banking institution may find it advantageous to quickly learn the time and the place where the card is used for the first time. For this reason, before the card is delivered to its bearer, it contains two triplets of the Sk=1 type, in which each third field Sk is at the value "1." In the area ZD, with the datum Dj corresponding to the date of the transaction and the datum Dj corresponding to the identity of the terminal, during the first transaction, the two blocks (Ti, Dj, "date") and (Ti, Dj', "terminal ID") will be sent to the network immediately.

GENERAL SUMMARY

While the preferred forms and embodiments of the invention have been illustrated and described, it will be apparent to those of ordinary skill in the art that various changes and modifications may be made without deviating from the inventive concept and spirit of the invention as set forth above, and it is intended by the appended claims to define all such concepts which come within the full scope and true spirit of the invention.

What is claimed is:

1. A portable object reader terminal having a memory in which an application program is stored and at least one output constituted by at least one of a display, a printer, or a communications network, or a portable object, said reader adapted to cooperate with a portable object including a non-volatile memory area (ZD) containing data including self-diagnostic or supervisory data (Ti, Dj, Sk), characterized in that said reader terminal comprises means for reading or storing, in said memory, said self-diagnostic or supervisory data (Ti, Dj, Sk) and means for sending said self-diagnostic or supervisory data (Ti, Dj, Sk) to the output specified as a function of information supplied by the self-diagnostic or supervisory data (Ti, Dj, Sk) following execution of at least one task Tt of said application program in connection with the portable object.

2. The terminal according to claim 1, further including means for activating the means for sending the self-diagnostic data (Ti, Dj, Sk) a predetermined number of times.

3. The terminal according to claim 1, characterized in that the means for sending the self-diagnostic or supervisory data comprise means for writing into the portable object connected to the terminal.

4. The terminal according to claim 1, characterized in that the self-diagnostic or supervisory data are constituted by at least one triplet (Ti, Dj, Sk) of information corresponding, for a first piece of information (Ti), to a predetermined task of the application program, for a second piece of information (Dj), to a data type correlated to the task executed and to be presented to an output, and for a third piece of information, to a value (Sk) for specifying the output to which the data type must be presented among those present in the terminal.

5. The terminal according to claim 1, characterized in that it further includes a means for testing for the presence of self-diagnostic or supervisory data in the portable object and for initiation of reading and storage of said data in a specific area (ZTD) of the memory of the terminal.

6. The terminal according to claim 1, characterized in that it comprises means for entering self-diagnostic or supervisory data into the portable object.

7. A process for supervising the operation of a terminal or for the self-diagnosis of a terminal cooperating with a portable object from a triplet of information (Ti, Dj, Sk) corresponding, for a first piece of information, to a predetermined task of an application program executed either by the portable object or by the terminal; for a second piece of information, to a data type correlated to a task executed and to be presented to an output of the terminal; and for a third piece of information, to a value for specifying the output of the terminal among those present in the terminal, characterized in that said process comprises:

executing the task of the application program in the terminal;

testing an indicator, either in the terminal or in the portable object, to determine whether a self-diagnostic or supervisory function is operational, then in the case of a positive response;

searching in a memory of either the portable object or the terminal to determine if among information stored there is a triplet of information wherein the first piece of information corresponds to the predetermined task executed by the terminal or the portable object; and sending to an output of the terminal specified by the triplet thus read the value of the datum correlated to the task executed and to be labeled by the second piece of information of the triplet.

8. The process according to claim 7, characterized in that it further comprises a testing step comprised of determining whether there are other tasks to be executed, and, if so, upon the execution of said tasks, searching for all triplets of information corresponding to the execution of said tasks.

9. The process according to claim 7, characterized in that it further comprises a step for reading from the contents of the portable object having stored in a non-volatile memory therein a plurality of triplets and a step for storing triplets read from said portable object memory in a non-volatile memory area of the terminal, followed by a step for activating an indicator of an active self-diagnostic or supervisory function.

10. The process according to claim 7, characterized in that it further comprises testing to determine whether the portable object is a card specific to the self-diagnostic or supervisory function or a general-purpose card.

11. The process according to claim 7, characterized in that the self-diagnostic or supervisory function includes a fourth field of information containing in the portable object initially the write address and the number of octets to be written, and after a self-diagnosis operation, a value to be written.

12. A portable object for use with a terminal equipped with an application program and having at least one output constituted either by a display, or by a printer, or by a communications network, or by a portable object, a memory for reading or storing, in said memory, self-diagnostic or supervisory data (Ti, Dj, Sk) and means for sending said data to outputs specified as a function of information supplied by the self-diagnostic or supervisory data following execution of at least one task Tt of the application program in connection with the portable object, characterized in that said portable object comprises a microprocessor card operating system for said card stored a first memory part of a non-volatile memory in the card, said non-volatile memory containing at least one triplet (Ti, Dj, Sk) of information stored in a predetermined area (ZD) of said non-volatile memory, the location of which is defined by address fields located in the first memory part used to store the operating system.

13. The portable object according to claim 12, characterized in that the first memory part of the non-volatile memory used to store the operating system also comprises, in a memory field, a piece of information constituting a counter of utilizations of the self-diagnostic function.

14. The portable object according to claim 12, characterized in that the first memory part storing the operating system comprises a memory field for storing an indicator of the activation of the self-diagnostic or supervisory function.

* * * * *